UNITED STATES PATENT OFFICE.

WALTER LAMB, OF BUFFALO, NEW YORK.

PROCESS OF PREPARING A FISH AND CEREAL FOOD.

1,125,131.  Specification of Letters Patent.  Patented Jan. 19, 1915.

No Drawing.   Application filed June 29, 1914.   Serial No. 847,961.

*To all whom it may concern:*

Be it known that I, WALTER LAMB, a citizen of the United States, residing at Buffalo, and State of New York, have invented new and useful Improvements in Processes of Preparing a Fish and Cereal Food, of which the following is a specification.

The object of my invention is to make cereal foods more nutritious and more palatable, by combining with them other foods; and indirectly to cheapen the cost of living.

My process relates to the combination of fish and fish products with cereals by the action of a liquid extract of fish, forming a food which may be sterilized and kept indefinitely in cans; I generally use a flavoring to make the food more palatable; prefering tomato or onion or both for this purpose; I also add the proper amount of salt.

In making the food I proceed as follows: I take a cereal combination preferably wheat flour and white corn meal (other cereals in other proportions will of course answer a good purpose). I make this cereal combination into a mass by combining with it a liquid extract of fish. In making the food I allow the liquid, preferably water to extract the nutritiousness from the fish and form an extract from it; and sometimes find it best to add to the food a quantity of fish that has not been deprived of its nutriment, retaining or rejecting the fish pulp from which the extract has been made.

To describe my process more definitely, the fish are cut in pieces and soaked for a while in water, after which this water containing the fish is usually gradually brought to a boil; the fish pulp left having of course, very little food value while the proteids from the fish form a very rich extract. I use this fish extract to form a mush like mass with the proper amount of cereal, I often use in conjunction a quantity of fish from which the nourishment has not been taken, usually discarding the fish pulp from which the extract has been made; a mass made in this way is very tasty and also very nutritious and presents a cereal food that is low in price and will take the place of meats when it is fried.

The food is seasoned to taste and put in packages of either glass or tin and these packages are closed and made air-tight, after which the food is subjected to heat by which it is cooked and sterilized.

I claim—

1. The process of making a fish and cereal food which consists in forming a mush-like mass by means of a cereal and fish extract formed by subjecting fish in a divided form to the action of a liquid, seasoning to taste, then placing the product in receptacles which are made air-tight and then subjected to heat by which the contents are cooked and sterilized substantially as described.

2. The process of making a fish and cereal food which consists in forming a mush-like mass by means of a cereal and liquid, the latter being in the form of a fish extract, made by subjecting fish in a divided form to the action of a liquid and forming a product composed of cereal, fish extract, seasoning and the fish from which the extract is made, then putting the same in packages which are made air-tight and then subjected to heat by which the contents are cooked and sterilized substantially as described.

3. The process of making a fish and cereal food which consists in forming a mush-like mass by means of a cereal and liquid, the latter being a fish extract, made by subjecting fish to the action of a liquid, incorporating in the mass, a quantity of fish in a divided form from which albumen has not been extracted, and seasoning and flavoring to taste, then putting the product in packages which are made air-tight and subjecting to heat by which the contents are cooked and sterilized substantially as described.

4. The process of making a fish and cereal food which consists in forming a mush-like mass by means of a cereal and liquid, the latter being a fish extract made by subjecting fish to the action of a liquid, incorporating in the mass, a quantity of fish in a divided form from which albumen has not been extracted, and utilizing the fish from which the extract is made, seasoning to taste and then putting in receptacles which are made air-tight and subjecting to heat by which the contents are cooked and sterilized, substantially as described.

WALTER LAMB.

Witnesses:
THOMAS C. MILLER,
M. J. TALMADGE.

Copies of this patent may be obtained for five cents each, by addressing the "Commissioner of Patents, Washington, D. C."